(No Model.)
R. W. HENT.
ROLLER BEARING.
No. 387,356. Patented Aug. 7, 1888.
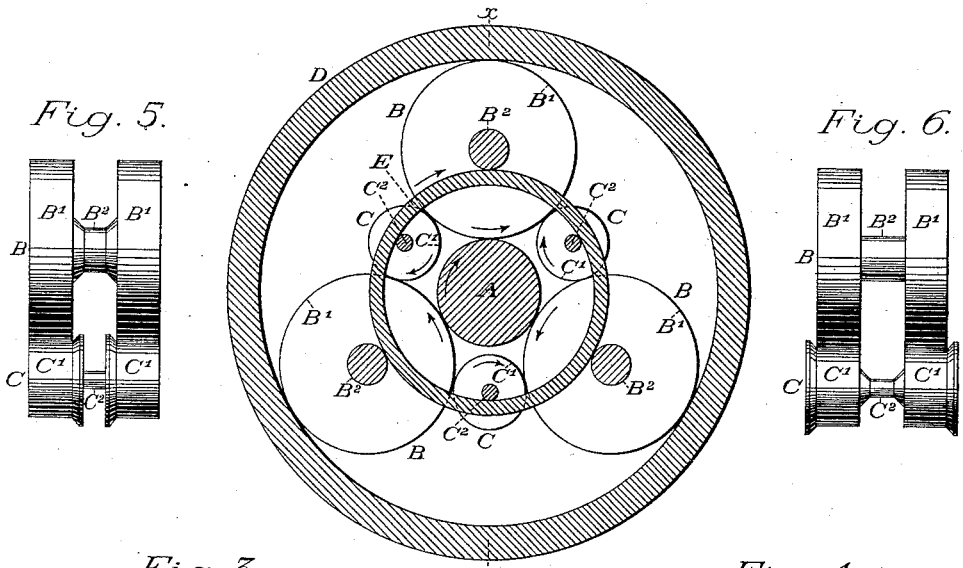
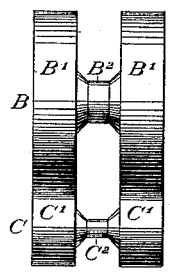
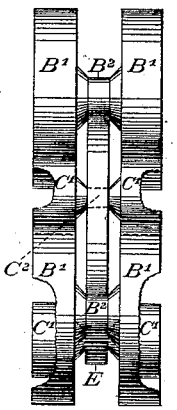
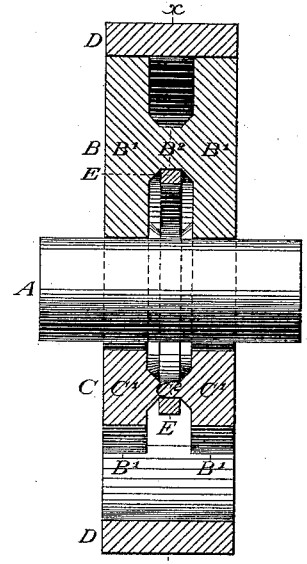
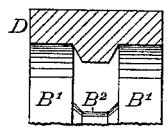
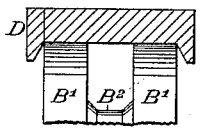
Witnesses:
John U. Pickerden.
John F. Hurney.
Inventor:
Reuben W. Hent.

UNITED STATES PATENT OFFICE.

REUBEN W. HENT, OF SAN FRANCISCO, CALIFORNIA.

ROLLER-BEARING.

SPECIFICATION forming part of Letters Patent No. 387,356, dated August 7, 1888.

Application filed April 16, 1887. Serial No. 235,040. (No model.)

*To all whom it may concern:*

Be it known that I, REUBEN W. HENT, a citizen of the United States, residing in the city and county of San Francisco, and State of California, have invented a certain new and useful Improvement in Roller-Bearings, of which the following is a specification.

My invention relates to that class of roller-bearings in which are employed a series of bearing-rollers bearing directly on both the shaft and casing, and a series of separating-rollers of smaller diameter bearing neither on the shaft nor casing, but on the bearing-rollers, to keep the latter separate from each other, and in which the separating-rollers are kept from contact with the shaft by their bearing on the bearing-rollers and from contact with the casing by their bearing on an encircling ring. This ring having only the separating-rollers for its bearings, its axis is liable to shift from the axis of the shaft to a detrimental extent.

The object of my invention is to limit said shifting. This object is attained by interposing the ring between journals of the bearing-rollers on its periphery and journals of the separating-rollers on its inner side, the two series of rollers being so arranged relatively to each other and their journals made of such small but adequate dimensions that an adequate ring may be interposed, as aforesaid, between adequate journals.

In such ring bearing at its periphery on journals of the bearing-rollers as well as at its inner side on journals of the separating-rollers, in said arrangement and journals of the rollers to render the employment of such ring possible, and in the peculiar construction and combinations of the parts hereinafter set forth, consists, essentially, my invention. It is illustrated in the accompanying drawings, in which—

Figure 1 is a transverse section through the center or on the line $x\ x$, Fig. 2, of a roller-bearing embodying my invention. Fig. 2 is a longitudinal section through the center or on the line $x\ x$, Fig. 1. Fig. 3 is a side view of a bearing-roller and a separating-roller, showing the relative positions of the rollers as seen along the plane tangent to both. Fig. 4 is a side view of said roller-bearing as it appears after the removal of the shaft and casing, portions of the rollers being broken away. Figs. 5, 6, 7, 8, and 9 are views showing means of retaining the several parts in their proper longitudinal positions. Fig. 10 is a side view of a short separating-roller.

A represents the shaft; B, the bearing-rollers, as wholes; C, the separating-rollers, as wholes; D, the casing, and E the ring. The ring is a hollow cylinder and coaxial with the shaft. Each bearing-roller B consists of two journals, B', and a smaller journal, $B^2$, located between the journals B'. These three journals are coaxial. The journals B' bear directly on the shaft A and the casing D, and form rolling-bearings either for a stationary casing on a rotating shaft or for a stationary shaft on a rotating casing. The journals $B^2$ rotate in contact with the periphery of the ring E and form rolling-bearings for the ring on the rollers B, thus limiting the shifting of its axis. Each separating-roller C consists of two journals, C', and a smaller journal, $C^2$, located between the journals C'. These three journals are coaxial.

The diameter of the journals C' must be so much smaller than that of the journals B' that the rollers C may be arranged relatively to the rollers B, as required, without touching the shaft. The journals C' bear neither on the shaft nor casing, but only on the journals B', each journal C' on and between two journals B', and at such a distance from the shaft that while keeping the rollers B separate from each other they also by such bearing keep the rollers C from contact with the shaft. The journals $C^2$ rotate in contact with the inner side of the ring E and form the bearings of the rollers C on the ring.

The ring is interposed between and bears on the journals $B^2$ at its periphery and the journals $C^2$ at its inner side.

The journals $B^2$ and $C^2$, axially rotating with the journals B' and C', respectively, in contrary directions, move at their lines of contact with the ring in the same direction, and thus the ring is rotated by and between the journals $B^2$ on its periphery and the journals $C^2$ on its inner side; and while the journals $B^2$ form rolling-bearings for the ring, and thus limit the shifting of its axis, as set forth, the ring forms rolling bearings for the journals $C^2$, and thus limits the shifting toward the casing of the rollers C from their proper positions between the rollers B. The arrow-heads indicate the relative directions, when the casing is stationary, of the axial rotations of the shaft, rollers, and ring. The rotation of the ring caused by the travel of the journals $B^2$ and $C^2$ is not attended with any friction. Its rotation caused by the axial rotations of the journals is attended with friction, but with rolling friction only, if the proportions hereinafter set forth are observed, thus rendering the roller-bearing free from sliding friction. The shaft, the journals B', and the casing, receiving the pressure of the load, incur wear, and consequently change their dimensions. The journals C', $C^2$, and $B^2$ and the ring, receiving none of this pressure, wear no more with than without it. The journals C' are required only to resist the pressure of the journals B' arising from any tendency of the rollers B, principally on account of their weight, to roll or fall from their proper positions when not prevented by sufficient pressure of the load.

The journals $C^2$ can be required only to resist the inward pressure of the weight of the ring and the outward pressure of the journals C' arising from their weight, their centrifugal force and their axes being out of the planes of the axes of the rollers B. If the velocity of the rollers C is great, the journals C' are preferably made as short as is consistent with their (little) required strength, to reduce their weight and therefore their centrifugal force. This may be still further reduced by making them hollow.

The journals $B^2$ can be required only to resist the inward pressure of the weight of the journals B' and the outward pressure of the ring arising from its weight, and any inequalities in the pressures of the journals $C^2$ on the ring tending to force its axis from the axis of the shaft.

The ring is required only to resist the outward pressure of the journals $C^2$ and the inward pressure of the journals $B^2$.

The pressures which the journals C', $C^2$, and $B^2$ and the ring are required to resist being so slight, it follows that in a roller-bearing having only a small number of rollers B, preferably three, the two series of rollers may be relatively arranged so that the rollers C may keep the rollers B separate from each other and be kept from contact with the shaft, and a ring, E, may be interposed between journals $B^2$ and $C^2$, as set forth, and yet said ring and journals $B^2$ and $C^2$, whether said proportions are observed or not, have dimensions (strength) ample to resist said pressures, thus rendering said construction practicable; and if said proportions are observed, and especially if said centrifugal force is reduced, as recommended, it follows, further, that the ring and journals C', $C^2$, and $B^2$ incur no substantial wear, and consequently retain substantially their original dimensions (strength) and their original proportions to each other, whatever the wear of the shaft, the journals B', and the casing, thus rendering said construction also durable; and, further, that the proportions necessary to avoid sliding friction can be destroyed only by the wear of the journals B', and the axis of the ring can shift only on account of the wear of the shaft, the journals B', and the casing.

The two series of rollers must be so arranged relatively to each other that, the orbit or circle in which the axes of the rollers C move being within the orbit or circle in which the axes of the rollers B move, the two orbits will be, on the one hand, so near each other that the rollers C will be kept from contact with the shaft by the bearing of the journals C' on the journals B', and, on the other hand, so far apart from each other that the space between the two orbits will suffice for the location of an adequate ring between adequate journals $B^2$ on its periphery and adequate journals $C^2$ on its inner side.

With reference only to the strength required of the rings and journals $B^2$ and $C^2$, the radial difference between the two orbits may be divided into four equal parts, and two of said parts taken for the thickness of the ring, one for the radius of the journals $B^2$, and the other for the radius of the journals $C^2$; but as, from the equality of the journals $B^2$ and $C^2$, sliding friction would ensue, the outer and inner diameters of the ring and the diameters of the journals B', C', $B^2$, and $C^2$ are preferably so proportioned that the quotient of the inner diameter of the ring divided by the diameter of a journal $C^2$, (equaling the number of its revolutions,) multiplied by the circumference of a journal C', will equal the quotient of the outer diameter of the ring divided by the diameter of a journal $B^2$, (equaling the number of its revolutions,) multiplied by the circumference of a journal B', thus necessitating a larger diameter of the journals $B^2$ and a smaller diameter of the journals $C^2$, as shown in Figs. 1, 2, 3, 4, 5, and 6. When, therefore, said proportions are observed, as recommended, the two series of rollers must be arranged relatively to each other, with reference also to said proportions, having due and special regard to the strength of the journals $C^2$, which are then the smallest (weakest) parts of the bearings.

The ring and journals $B^2$ and $C^2$ are of equal length, and this need be only a small fraction of that of the rollers B. The journals C' may be still shorter, as shown in Fig. 10.

Longitudinally the rollers C may be retained by the ring, as shown in Figs. 2 and 4, or by flanges, as shown in Figs. 5 and 6, or by other equivalent means. The ring may be retained by the inner ends of the journals B', in which case it may retain the rollers C, as aforesaid, Figs. 2 and 4, or by the inner ends either of the journals B', Fig. 5, or of the journals C', Fig. 6, when the rollers C themselves are not retained by the ring. When any of said ends either retain the ring or by means of the ring the rollers C, they are preferably beveled, as shown in the drawings.

The rollers B may be retained upon the shaft by a single collar between the inner ends of the journals B', Fig. 9, or by collars at the outer ends, or other equivalent means, preferably by said single collar. They may be retained within the casing by a single collar between the inner ends of the journals B', Fig. 7, or by flanges at the ends of the casing, Fig. 8, or other equivalent means.

Preferably all the collars and flanges are beveled, as shown in the drawings.

It is evident that each roller B may consist of a single journal B' and two journals $B^2$, located one at each end of such single journal B', and each roller C may consist of a single journal C' and two journals $C^2$, located one at each end of such single journal C', necessitating the employment of two rings. Evidently, also, each roller B may have more than two journals $B^2$ and each roller C more than two journals $C^2$, a ring E being employed for each set of journals $B^2$ and $C^2$. Therefore I do not intend to limit my claims to one ring E and one set of journals $B^2$ and $C^2$, nor to any particular location longitudinally on the rollers B and C of the rings and sets of said journals $B^2$ and $C^2$.

I claim as my invention—

1. In a roller-bearing, a ring bearing at its periphery on journals of a series of rollers bearing directly on the shaft and casing and at its inner side on journals of a series of rollers bearing neither on the shaft nor casing, but on the rollers of the other series, all said parts combined substantially as set forth.

2. In a roller-bearing of the class herein described, the ring E, adapted to bear at its periphery on the journals $B^2$ of the bearing-rollers B, consisting each of a journal, $B^2$, and of two journals, B', bearing directly on the shaft A and casing D, and to bear at its inner side on the journals $C^2$ of the separating-rollers C, consisting each of a journal, $C^2$, and of two journals, C', bearing only on the journals B', all said parts combined substantially as shown and described, and for the purposes set forth.

3. In a roller-bearing, the combination of a series of rollers bearing directly on the shaft and casing and having journals adapted to rotate in contact with the periphery of a ring coaxial with the shaft, and a series of rollers bearing neither on the shaft nor casing, but on the rollers of the other series, and having journals adapted to rotate in contact with the inner side of said ring, all constructed and arranged substantially as set forth.

4. In a roller-bearing of the class herein described, the combination of the series of bearing-rollers B, each consisting of a journal, $B^2$, adapted to rotate in contact with the periphery of the ring E, coaxial with the shaft A, and of two journals, B', bearing directly on the shaft and casing, and the series of separating-rollers C, each consisting of a journal, $C^2$, adapted to rotate in contact with the inner side of said ring, and of two journals, C', bearing only on the journals B', all constructed and arranged substantially as shown and described, and for the purposes set forth.

5. In a roller-bearing, the combination, with a ring coaxial with the shaft, of a series of rollers bearing directly on the shaft and casing and having journals adapted to rotate in contact with the periphery of said ring, and a series of rollers bearing neither on the shaft nor casing, but on the rollers of the other series, keeping the latter separate from each other, and having journals adapted to rotate in contact with the inner side of said ring, all constructed and arranged substantially as and for the purposes set forth.

6. In a roller-bearing of the class herein described, the combination, with the ring E, coaxial with the shaft A, of the series of bearing-rollers B, consisting each of two journals, B', bearing directly on the shaft and casing, and of a journal, $B^2$, located between the journals B' and adapted to rotate in contact with the periphery of said ring, and the series of separating-rollers C, keeping the rollers B separate from each other, and consisting each of two journals, C', bearing only on the journals B', each journal C' on and between two journals, B', and of a journal, $C^2$, located between the journals C' and adapted to rotate in contact with the inner side of said ring, all constructed and arranged substantially as shown and described, and for the purposes set forth.

7. In a roller-bearing, the combination, within the casing, of the shaft, a ring coaxial with the shaft, a series of rollers bearing directly on the shaft and casing and having journals adapted to rotate in contact with the periphery of said ring, and a series of rollers bearing neither on the shaft nor casing, but on the rollers of the other series, and keeping the latter separate from each other, and by such bearing kept from contact with the shaft, and having journals adapted to rotate in contact with the inner side of said ring, all constructed, arranged, and operating substantially as and for the purposes set forth.

8. In a roller-bearing of the class herein described, the combination, within the casing D, of the shaft A, the series of bearing-rollers B, consisting each of two journals, B', bearing directly on the shaft and casing, and of a journal, $B^2$, located between the journals B' and adapted to rotate in contact with the periphery of the ring E, coaxial with the shaft, the series of separating-rollers C, keeping the rollers B separate from each other, and kept by their bearing on the latter from contact with the shaft, and consisting each of two journals, C', bearing only on the journals B', each journal C' on and between two journals B', and of a journal, $C^2$, located between the journals C' and adapted to rotate in contact with the inner side of said ring, and the said ring E adapted to bear at its periphery on the journals B² and at its inner side on the journals C², all constructed, arranged, and operating substantially as shown and described, and for the purposes set forth.

9. A roller-bearing comprising the shaft A, the casing D, the series of bearing-rollers B, consisting each of two journals, B', bearing directly on the shaft and casing, and of a journal, B², located between the journals B' and rotating in contact with the periphery of the ring E, coaxial with the shaft, the series of separating-rollers C, consisting each of two journals, C', bearing only on the journals B', each journal C' on and between two journals B', and of a journal, C², located between the journals C' and rotating in contact with the inner side of said ring, and the said ring bearing at its periphery on the journals B² and at its inner side on the journals C², all constructed, arranged, combined, and adapted to operate substantially as shown and described, and for the purposes set forth.

In testimony whereof I affix my signature in the presence of two witnesses.

REUBEN W. HENT.

Witnesses:
DAVID P. BELKNAP,
EUGENE W. LEVY.